(12) United States Patent
Schaefer (10) Patent No.: US 8,925,992 B2
(45) Date of Patent: Jan. 6, 2015

(54) VEHICLE WITH AN INSULATING DEVICE AND INSULATING DEVICE FOR A VEHICLE

(71) Applicant: GM Global Technology Operations LLC, Detroit, MI (US)

(72) Inventor: Thilo Schaefer, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/952,903

(22) Filed: Jul. 29, 2013

(65) Prior Publication Data

US 2014/0028045 A1    Jan. 30, 2014

(30) Foreign Application Priority Data

Jul. 30, 2012    (DE) .......................... 10 2012 014 949

(51) Int. Cl.
  *B60R 13/08*    (2006.01)
  *B62D 25/16*    (2006.01)
(52) U.S. Cl.
  CPC .............. *B60R 13/08* (2013.01); *B62D 25/161* (2013.01); *B62D 25/165* (2013.01)
  USPC .......................................... 296/39.3; 296/198
(58) Field of Classification Search
  USPC .................................... 296/39.3, 193.06, 198
  See application file for complete search history.

(56) References Cited

U.S. PATENT DOCUMENTS

| 8,056,953 B2 * | 11/2011 | Kiskiras et al. .............. 296/39.3 |
| 8,371,634 B2 | 2/2013 | Covarrubias |
| 2012/0126578 A1 * | 5/2012 | Hernandez Covarrubias ............ 296/193.06 |

FOREIGN PATENT DOCUMENTS

| FR | 2925427 A1 | 6/2009 |
| JP | H11227635 A | 8/1999 |
| JP | 2001088745 A | 4/2001 |
| JP | 2004026060 A | 1/2004 |
| JP | 2004058922 A | 2/2004 |
| JP | 2006168464 A | 6/2006 |
| WO | 2012110866 A1 | 8/2012 |

OTHER PUBLICATIONS

German Patent Office, German Search Report for Application No. 102012014949.2, dated Mar. 19, 2013.

* cited by examiner

*Primary Examiner* — Joseph D Pape
*Assistant Examiner* — Dana Ivey
(74) *Attorney, Agent, or Firm* — Ingrassia Fisher & Lorenz, P.C.

(57) ABSTRACT

A vehicle is provided with a bodywork section, a fender and an insulating device. Between the bodywork section and the fender a free space is formed. The insulating device for noise and/or moisture insulation is arranged between a drive region and a passenger compartment of the vehicle in the free space. The insulating device along its longitudinal extension L comprises first lateral support regions, with which it supports itself on the bodywork section and on the fender. The insulating device comprises second lateral support regions, with which the insulating device supports itself angularly with respect to the longitudinal extension L on the bodywork section and on the fender. The insulating device comprises third lateral support regions, with which the insulating device supports itself parallel to the longitudinal extension and offset in or against the travelling direction F of the vehicle on the bodywork section and on the fender.

13 Claims, 5 Drawing Sheets

VEHICLE WITH AN INSULATING DEVICE AND INSULATING DEVICE FOR A VEHICLE

CROSS-REFERENCE TO RELATED APPLICATION

This application claims priority to German Patent Application No. 10 2012 014 949.2, filed Jul. 30, 2012, which is incorporated herein by reference in its entirety.

TECHNICAL FIELD

The technical field relates to a vehicle with an insulating device and an insulating device for a vehicle.

BACKGROUND

It is known to arrange insulating devices between a vehicle body and a fender in order to seal off or insulate a drive region of the vehicle, for example an engine compartment or a wheel housing with respect to a passenger compartment of the vehicle against noise and moisture. Publication DE 10 2011 118 889 A1, which appears to form the closest prior art, describes a combination in a motor vehicle with a noise insulator covering. The noise insulator covering is pressed in behind a vehicle tire between a bodywork section region and the fender against a travelling direction of the vehicle and laterally supports itself along its longitudinal extension on both.

At least one object is to provide a vehicle whose passenger compartment is insulated against noises and/or moisture from a drive region in a functionally secure manner. In addition, other objects, desirable features and characteristics will become apparent from the subsequent summary and detailed description, and the appended claims, taken in conjunction with the accompanying drawings and this background.

SUMMARY

A vehicle, in particular a passenger car or commercial vehicle, is provided with a bodywork section, a fender and an insulating device. Preferentially, the bodywork section is formed as a vehicle pillar, for example, an A-pillar, or as a wheel housing for the wheel of the vehicle. The fender is preferentially fitted onto the bodywork section and stands away from the latter preferentially in a convex form.

Between the bodywork section and the fender, a free space is formed in which the insulating device for noise and/or moisture insulation is arranged between a drive region and a transition region of the vehicle door to a passenger compartment of the motor vehicle. Preferentially, an engine compartment and/or the wheel housing are/is arranged in the drive region.

Preferentially, the free space and/or the insulating device arranged therein adjoins the drive region and/or the transition region of the vehicle door to the passenger compartment or it is arranged adjacent to this/these. Alternatively or optionally additionally, the free space is arranged against a travelling direction of the vehicle behind the wheel.

The insulating device, in particular in the installed state in the vehicle, has a longitudinal extension that corresponds to, is similar or adapted to a height of the fender. In particular, the longitudinal extension of the insulating device amounts to at least approximately 60%, preferentially at least approximately 70%, in particular at least approximately 80% or fills out the height of the fender.

The insulating device along its longitudinal extension comprises first lateral support regions, with which it supports itself on the bodywork section and on the fender. In particular, the insulating device is pressed in between the bodywork section and the fender, so that the first lateral support regions bear against or seal against the bodywork section and the fender. The insulating device comprises second lateral support regions, with which the insulating device supports itself angularly, e.g., right-angularly with respect to the longitudinal extension on the bodywork section and on the fender. Preferentially, the insulating device supports itself on the bodywork section and on the fender with the two lateral support regions in or against the travelling direction of the vehicle.

Alternatively to the second lateral support regions or complementarily to these, the insulating device comprises third lateral support regions. The third support regions run parallel or equi-directionally to the first support regions, however the third support regions are at least partially or completely offset, i.e., arranged offset in parallel with respect to the first support regions. The offset direction is oriented in or against the travelling direction. The third support regions likewise support themselves on the bodywork section and on the fender.

In the event that the insulating device comprises the second and the third support regions it is particularly preferred when between the first, the second and the third support regions, fourth lateral support regions are arranged, which likewise support the insulating device on the bodywork section and on the fender. These fourth support regions on the one hand enlarge the support surface next to the first support regions, on the other hand the support regions can support themselves with respect to one another via the fourth support regions, so that the mechanical stiffness or sturdiness of the insulating device is improved.

At least one advantage is that the insulating device through the second and/or third lateral support regions is positioned or can be positioned functionally securely in the free space between the bodywork section and the fender. In particular, loosening, slipping or twisting of the insulating device out of its intended position in the free space is avoided or prevented.

In a preferred embodiment, the insulating device comprises at least one continuation, which comprises the second and/or the third lateral support regions. Through the supporting of the second and/or third support regions, an anti-twisting protection against twisting of the insulating device about a longitudinal axis of the insulating device running in the longitudinal extension is formed.

The insulating device in a top view (production position) comprises at least one folding edge running transversely to the longitudinal extension. Preferentially, the at least one folding edge divides the insulating device into at least one end portion and into one main portion. For example, two folding edges divide the insulating device into two end portions and into one middle portion. In particular, the insulating device comprises at least one end portion, which is folded about the at least one folding edge, so that the at least one continuation angularly standing away from the longitudinal extension is formed.

In another embodiment, the at least one continuation is secured against a slipping in or against the travelling direction through a positive connection. In particular, the at least one continuation is secured against slipping in a positively connected manner through the fender and/or through further components of the vehicle. Thus, the insulating device, in particular with the vehicle in driving mode, cannot come loose from the intended position and because of this reliably fulfills the noise and moisture insulating function.

In another embodiment, the at least one continuation is formed as a first continuation. Preferentially, the first continuation is arranged on a first, for example upper end of the longitudinal extension of the insulating device and stands away from the latter angularly with respect to the longitudinal extension. The first continuation is secured in a positively connected manner against the slipping in or against the travelling direction through a surrounding fender fold and by bearing against a turn signal lamp or another component of the vehicle. In particular, the first continuation is held positively connected in travelling direction through the fender fold and against the travelling direction through the turn signal lamp or the other component of the vehicle.

Alternatively or optionally complementarily, the at least one continuation is formed as a second continuation. Preferentially, the second continuation is arranged on a second, for example lower end of the longitudinal extension of the insulating device. The second continuation angularly stands away from the longitudinal extension of the insulating device. For example, the second continuation is secured on both sides through positive connection through further surrounding fender folds against the slipping in and/or against the travelling direction of the vehicle. In an embodiment, a liquid drain opening is introduced into the second continuation, through which liquid, in particularly from the free space, can drain. The liquid can for example be splash water or melt water accumulated in the wheel housing.

In another embodiment, the insulating device in a top view has a tub shape with a surrounding rim or bead, as a result of which the insulating device has an open cavity. Preferentially, the insulating device in its tub shape is formed following the shape of the fender, in particular adapted to the shape of the fender. Specifically, the insulating device has a radii profile, which is similar to a radii profile of the fender or adapted to the latter. Thus, the insulating device in particular during the installation in the free space favorably adapts to the fender and can securely implement its insulating effect.

The surrounding rim or bead in an extension of the at least one folding edges, notches are introduced. The notches are formed V-shaped, for example. Preferentially, the notches facilitate or make possible folding the at least one portion of the insulating device about the folding edge and forming the at least one continuation standing away angularly with respect to the longitudinal extension of the insulating device.

Since the rim or bead optionally also runs along the continuation, it also stands away through its angular arrangement parallel or equi-directionally to the longitudinal direction and offset in or against the travelling direction. In particular, the second and/or third and/or fourth lateral support regions are formed through the rim or bead or arranged on the latter.

In an embodiment, the surrounding rim or bead comprises, preferentially due to the production, a fold which laterally stands away from the rim or bead. Preferably, the fold forms a sealing lip which supports or amplifies the noise and/or moisture-insulating effect of the insulating device.

The insulating device through the fold bears more tightly and/or closely against the bodywork section and/or fender and can offset tolerances because of the fastening of the fender to the bodywork section. Preferentially, the fold has a maximum width of approximately 10 mm, in particular a maximum of approximately 5 mm, specifically a maximum of approximately 3 mm. For example, the fold is formed during the production of the insulating device, in particular during a deep-drawing, form-pressing or foaming process.

An embodiment provides that an insert reinforcing the noise and/or moisture insulation can be inserted into the open cavity of the insulating device. Preferentially, the insert, in particular through the continuation, can be held through positive connection in the open cavity. Alternatively or optionally complementarily, the insert can be welded or glued in the open cavity in order to ensure a secure hold therein.

In an embodiment, the insulating device and optionally complementarily the insert are formed of a material which absorbs noise and/or seals off moisture. For example, the insulating device and optionally complementarily the insert are formed of a PE-foam and/or of an EPDM-foil (ethylene-propylene-dien-rubber). Possible is also the use of a sandwich material of different materials, which preferably comprises the PE-foam and the EPDM-foil. By using such materials, weight can be saved in an advantageous manner. The weight saving has also positive effects on a fuel consumption of the vehicle and thus helps to save costs.

Preferably, a deep-drawing, form-pressing of foaming process is carried out during the production of the insulating device. Optionally complementarily, a cutting process is carried out, which preferentially follows the deep-drawing, form-pressing or foaming process or takes place simultaneously with these. Thus, the insulating device can be produced in a simple and cost-effective manner.

An insulating device, which is formed for a vehicle according to the previous—embodiments. The insulating device can be arranged for the noise and/or moisture insulation between the drive region and the passenger compartment in the free space. Along its longitudinal extension, the insulating device comprises first lateral support regions, with which it can support itself on the bodywork section and on the fender of the vehicle. It also comprises second lateral support regions, with which it can support itself angularly to the longitudinal extension on the bodywork section and on the fender. Alternatively to the second lateral support regions or optionally complementarily, the insulating device comprises third lateral support regions, with which it can support itself parallel to the longitudinal extension and offset in or against the travelling direction on the bodywork section and on the fender.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
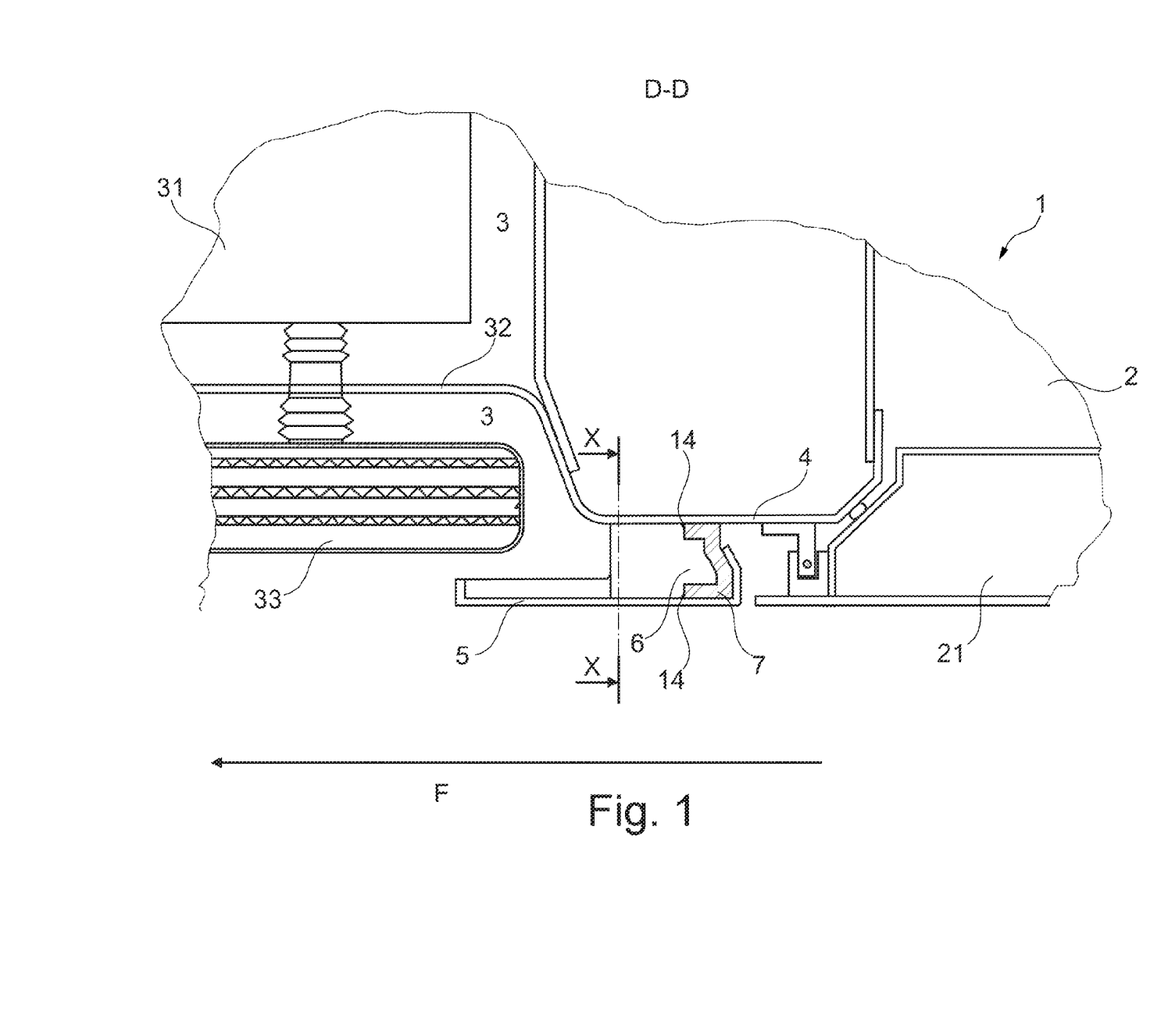
FIG. 1 is a horizontal section D-D through a front region of a vehicle with an insulating device arranged between a bodywork section and a fender.

FIG. 1 shows a horizontally running section D-D through a detail of a vehicle 1 as an embodiment. The vehicle 1 comprises a passenger compartment 2 and a drive region 3, which comprises an engine 31 and a wheel housing 32, where in the wheel housing a wheel 33 is arranged. The passenger compartment 2 follows the drive region 3 against a travelling direction F of the vehicle and is closed off towards the outside by a vehicle door 21.

The vehicle 1 comprises a bodywork section 4, which for example is formed as an A-pillar. Furthermore, the vehicle 1 comprises a fender 5, which in travelling direction F is arranged substantially parallel, parallel or equi-directionally to the bodywork section 4. Between the bodywork section 4 and the fender 5 a free space 6 is located, which is arranged adjacent to the passenger compartment 2 and to the drive region 3.

The vehicle 1 comprises an insulating device 7, which is arranged in the free space 6 and is formed for the noise and/or moisture insulation between the drive region 3 and the passenger compartment 2. Thus it is prevented, avoided or prevented that moisture and/or drive noises from the drive region 3 reach the passenger compartment 2. The insulating device 7 is formed of a noise-absorbing and moisture-insulating material, e.g., of an expanded PE-foam, PUR-foam and/or of an EPDM-foil. It is produced through a foaming process or through a deep-drawing or pressing process and subsequently or simultaneously completed through a cutting process.

Figure 2:
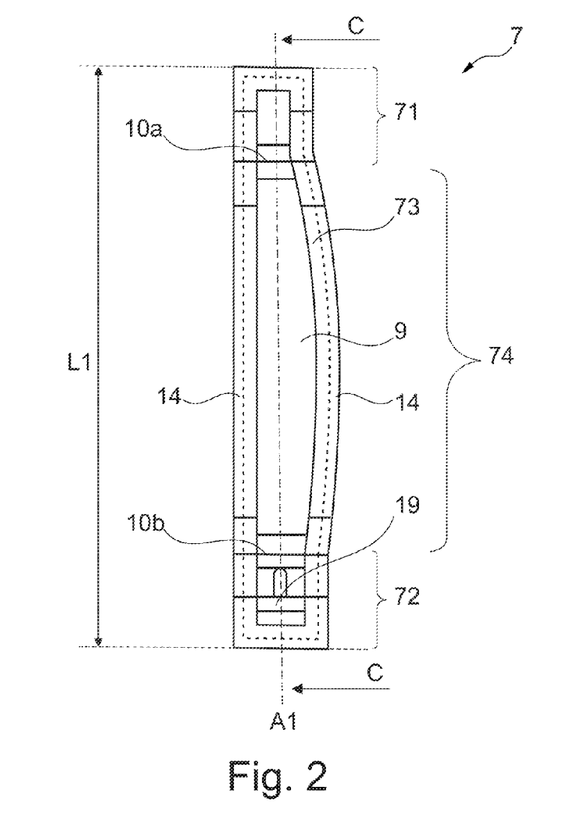
FIG. 2 is the insulating device in a state not installed in the vehicle.
Figure 3:
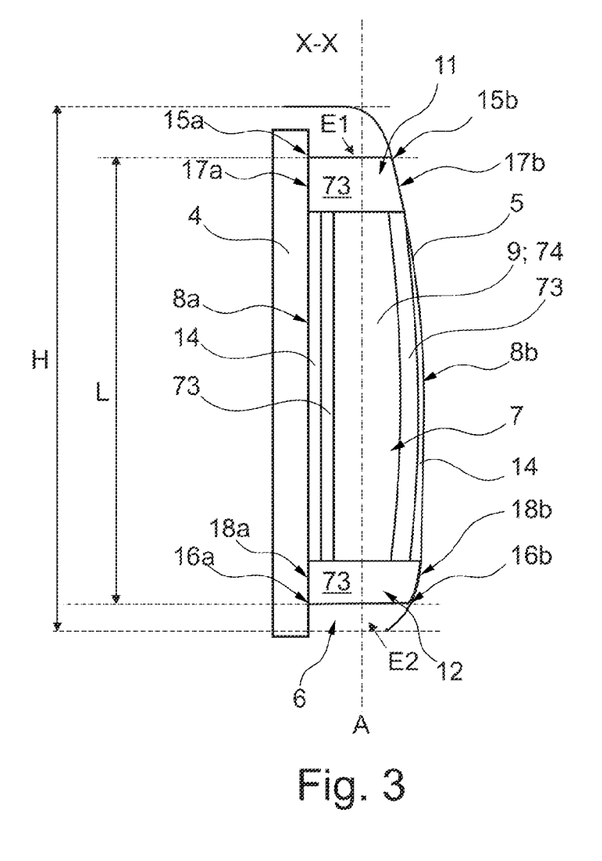
FIG. 3 is the bodywork section, the fender and the insulating device in a view on a section X-X, which runs vertically to a travelling direction of the vehicle.

FIG. 2 shows a top view of the insulating device 7 in the state not installed in the vehicle. In FIG. 3, the top view of the insulating device 7 from FIG. 2 is shown, in which it is installed in the vehicle. In particular, FIG. 3 shows a section along the section line X-X from FIG. 1, 4 through the free space 6, which is delimited by the bodywork section 4 and by the fender 5. The section runs perpendicularly to the travelling direction of the vehicle 1. The insulating device 7 in the uninstalled state according to FIG. 2 has a length L1 in longitudinal extension which is greater than a length L in longitudinal extension in the installed state shown in FIG. 3.

According to FIG. 2, the insulating device 7 has a tub shape with a surrounding rim or bead 73, through which an open cavity 9 is formed. The surrounding rim or bead 73 for example has a height between approximately 20 mm and approximately 100 mm. On the surrounding rim or bead 73, a for example surrounding fold 14 is arranged, which stands away from said rim or bead laterally, in particular perpendicularly towards the outside. The fold 14 is for example molded onto the rim or bead 73 during the foaming process for producing the insulating device 7 and is formed during the production through the deep-drawing, pressing process. During the cutting process following the production, the fold 14 can be cut to a fitting width of for example maximally approximately 10 mm, preferentially maximally approximately 5 mm.

Figure 4:
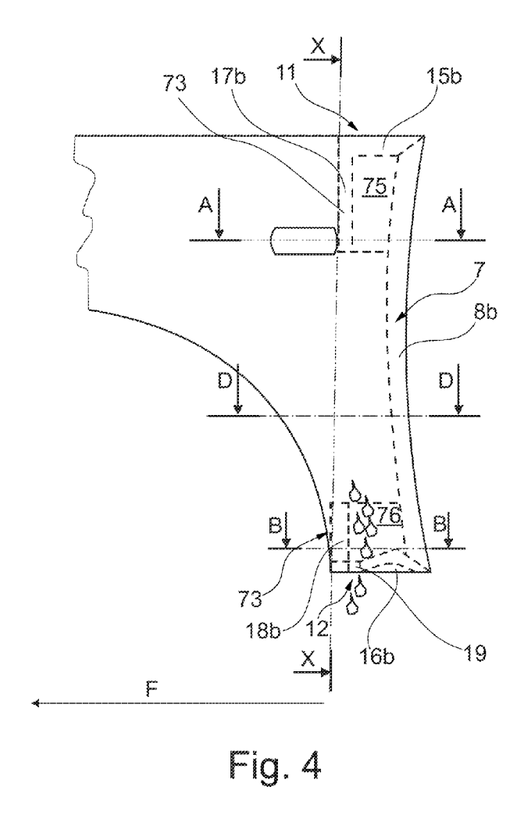
FIG. 4 is a lateral view of the fender on a vehicle longitudinal side with the insulating device from FIG. 5 arranged behind the fender.

The insulating device 7 has a first and a second folding edge 10a; 10b running transversely or perpendicularly to the longitudinal extension, which divides the insulating device 7 into a middle portion 74 and into a first and second portion 71; 72 as free end portions. By folding over the first and second portion 71; 72 about the corresponding folding edge 10a; 10b, the insulating device 7 is transferred from the length L1 (FIG. 2) of the uninstalled state into the length L (FIG. 3, FIG. 7) of the installed state (FIG. 1; FIG. 4).

By folding over the first and second portion 71; 72 about the corresponding folding edge 10a; 10b, a first and a second continuation 11; 12 (FIG. 3, 7) is formed. The first continuation 11 is arranged on a first, in particular upper end E1 of the insulating device 7 and stands away angularly, in particular at a right angle with respect to the longitudinal extension of the insulating device 7. The second continuation 12 is arranged on a second, in particular lower end E2 of the insulating device 7 and stands away angularly, in particular at a right angle with respect to the longitudinal extension of the insulating device 7. In the view of the insulating device according to FIG. 3, both continuations 11; 12 stand out of the Figure plane.

As is shown in FIG. 3, the insulating device 7 in the installed state is arranged in the vehicle 1 in the free space 6. In this arrangement, its length L takes up approximately 60%, preferentially approximately 70%, in particular approximately 80% of a height H of the fender 5 or fills out the height. The insulating device 7 in its outer contour is adapted to a shape of the fender 5, in particular to a radii profile of the fender or is similar to this, so that it completely fills out and can insulate the spacing between the bodywork section 4 and the fender in the free space 6.

The one insert reinforcing the insulating effect can be inserted in the open cavity 9 of the insulating device 7 that is formed through the surrounding rim or bead 73. Preferably, the insert is held in the open cavity 9 by positive connection through the continuations 11; 12. Optionally, it can also be welded or glued therein for secure fastening.

Figure 5A:
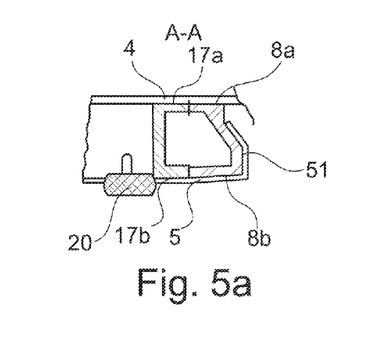
FIG. 5a is a sectional view of a first continuation along the section line A-A from FIG. 4.
Figure 5B:
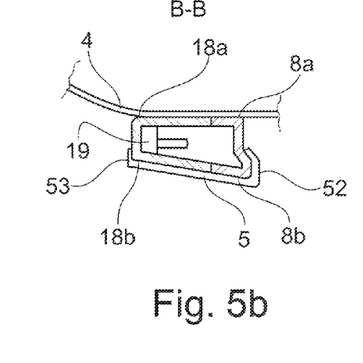
FIG. 5b is a sectional view of a second continuation along the section line B-B from FIG. 4.

FIG. 4 shows a lateral view of the fender 5 with the insulating device from FIG. 5 arranged behind the fender 5. FIG. 5a shows a sectional view of the first continuation 11 along the section line A-A from FIG. 4. FIG. 5 shows the lateral view of the second continuation 12 along the section line B-B from FIG. 4. With first lateral support regions 8a; 8b (see FIG. 3, FIG. 4, FIG. 5a and FIG. 5b), which are arranged along the length L of their longitudinal extension, in particular along the middle portion 74, the insulating device 7 bears against the bodywork section 4 and the fender 5. In particular, the insulating device 7 along the length L in its longitudinal extension, is pressed in in particular along the middle portion 74, between the bodywork section 4 and the fender 5, so that the first lateral support regions 8a; 8b contact the bodywork section 4 and the fender 5. With two lateral support regions 15a; 15b; 16a; 16b (see FIG. 3; FIG. 4; FIG. 5a; FIG. 5b), the insulating device 7 bears against the bodywork section 4 and the fender 5 angularly to the longitudinal extension.

The first continuation 11 comprises the second lateral support regions 15a; 15b and the second continuation 12 the second lateral support regions 16a; 16b. In that the continuations 11; 12 stand away angularly from the longitudinal extension L of the insulating device 7, its second lateral support regions 15a; 15b; 16a; 16b likewise bear against the bodywork section 4 and the fender 5 angularly with respect to the longitudinal extension L.

The insulating device 7 comprises third lateral support regions 17a; 17b; 18a; 18b (FIG. 3, FIG. 4; FIG. 5a; FIG. 5b), which run parallel to the longitudinal extension L and offset in travelling direction with respect to the first lateral support regions 8a; 8b where they support themselves on the bodywork section 4 and on the fender 5. In particular, the third lateral support regions 17a; 17b; 18a; 18b are arranged or oriented angularly with respect to the second lateral support regions 15a; 15b; 16a; 16b.

The rim or bead 73 running about the first continuation 11 comprises the third lateral support regions 17a; 17b. The third lateral support regions 18a; 18b are arranged on and formed by the rim or bead 73 of the second continuation 12. In that the rim or bead 73 is arranged on the continuations 11; 12 and angularly stands away from these, the rim or bead 73 with its third laterally support regions 17a; 17b; 18a; 18b bears against the bodywork section 4 and the fender 5 parallel to the longitudinal extension L and, in particular offset in travelling direction F.

The support of the insulating device 7 that is oriented angularly with respect to the longitudinal extension, which is implemented through the second lateral support regions 15a; 15b; 16a; 16b and/or the support running parallel to the longitudinal extension L and offset in travelling direction F, which is formed by the third lateral support regions 17a; 17b; 18a; 18b, forms an anti-twisting protection for the insulating device 7. Through the anti-twisting protection, twisting of the insulating device 7 about a longitudinal axis A (FIG. 3) running in the longitudinal extension L, in particular during the driving operation of the vehicle 1, is prevented. Thus, a continuously secure positioning of the insulating device 7 in the free space 6 can be ensured.

The insulating device 7 comprises fourth support regions 75 and 76 between the support regions 8b, 15b, 17b of the first continuation 11 and between support regions 8b, 16b, 18b of the second continuation 12. The fourth support regions 75 and 76 complement the other support regions 8b, 15b, 17b of the first continuation 11 and 8b, 16b, 18b of the second continuation 12 into a continuous support surface. The fourth support regions 75, 76 are provided both on the side of the fender 5 (as shown in FIG. 4) as well as on the side of the bodywork section 4.

According to FIG. 4; FIG. 5a and FIG. 5b, the first and second continuation 11; 12 are secured through positive connection against slipping in or against the travelling direction F of the vehicle 1. In particular, the first continuation 11 is secured through positive connection against the travelling direction F through a surrounding fender fold 51 and in travelling direction F by bearing against a turn signal lamp or body attachment part 20 of the vehicle 1. The second continuation 12 is secured through positive connection against slipping in and against the travelling direction F by two further fender folds 52; 53.

Figure 6:
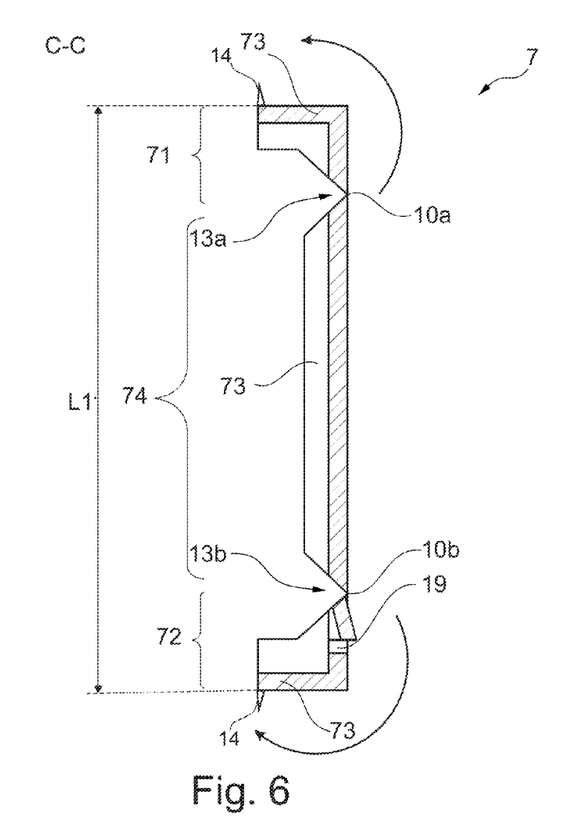
FIG. 6 is the insulating device from FIG. 2 in a sectional representation, wherein the section C-C runs along a longitudinal axis of the insulating device.

As is shown in FIG. 3 and FIG. 6, the fold 14 which stands away from the rim or bead 73 forms an additional sealing lip, which reinforces the noise and/or moisture-insulating effect of the insulating device 7 (FIG. 3) installed in the vehicle with respect to the bodywork section 4 and the fender 5. In particular, the insulating device 7 through the fold/sealing lip 14 with the first, second and third lateral support regions 8a; 8b; 15a; 15b; 16a; 16b; 17a; 17b; 18a; 18b even more accurately or flusher to the profile of the bodywork section 4 and the fender 5. Any assembly-related tolerances between the bodywork section and the fender can be offset through the fold/sealing lip 14. Thus, the noise and/or moisture insulation can also be ensured through the insulating device 7 even with large tolerances.

FIG. 6 shows the insulating device 7 in a sectional view C-C along a longitudinal axis A1 (FIG. 2) running in the longitudinal extension L in the state not installed in the vehicle 1. The insulating device 7 is divided into the middle portion 74 and into the first and second portion 71; 72 through the first and second folding edge 10a; 10b (FIG. 6). The first and second portion 71; 72 initially extend further along the longitudinal extension L. The course of the first and second portion 71; 72 then changes the direction, wherein said direction is directed at a right angle to the longitudinal extension L.

In extension of the first and second folding edge 10a; 10b, a V-shaped first and second notch 13a; 13b is introduced onto the surrounding rim or bead 73, which facilitates the folding of the first and second portion 71; 72 about the corresponding folding edge 10a; 10b and because of this makes possible forming the first and second continuation 11; 12 standing away angularly with respect to the longitudinal extension L.

The second portion 72, which later on after the folding about the second folding edge 10 forms the second continuation 12, comprises a liquid passage opening 19. Through this, splash water collected for example in the wheel housing 32 can drain out of the second continuation 12 as shown in FIG. 4. The V-shaped notches 13a; 13b are co-molded on or like the liquid passage opening 19, are formed through the cutting process during the production of the insulating device 7.

Figure 7:
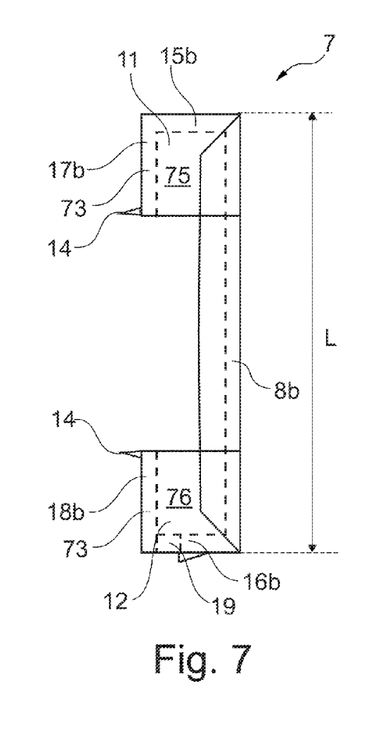
FIG. 7 is the insulating device in the view of FIG. 6 with the first and second continuation from FIGS. 5a and 5b folded in installation position.

FIG. 7 shows the insulating device 7 in the view of FIG. 6 with the first and second portion 71; 72 of the insulating device 7, which are folded over to the continuations 11; 12. During the insulation of the insulating device 7 in the free space 6 of the vehicle 1 (FIG. 1), the insulating device is transferred from the state shown in FIG. 6 into the state shown in FIG. 7. In particular, the portions 71; 72 fold about the folding edges 10a; 10b through the sliding-in of the insulating device 7 into the free space 6 and form the continuations 11; 12 angularly standing away from the longitudinal extension L.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle, comprising:
a bodywork section;
a fender;
a free space defined between the bodywork section and the fender;
an insulating device positioned in the free space, the insulating device extending along a longitudinal extension and the insulating device comprising:
first lateral support regions that extend along the longitudinal extension for supporting the insulating device on the bodywork section and the fender;
second lateral support regions for angularly supporting the insulating device with respect to the longitudinal extension on the bodywork section and on the fender; and
third lateral support regions for supporting the insulating device parallel with respect to the longitudinal extension and offset with respect to a travelling direction of the vehicle on the bodywork section and the fender,
wherein the insulating device further comprises at least one continuation that comprises the second lateral support regions and angularly supports with these angularly with respect to the longitudinal extension of the insulating device on the bodywork section and the fender to protect against twisting of the insulating device about a longitudinal axis running in the longitudinal extension.

2. The vehicle according to claim 1, wherein the insulating device further comprises at least one continuation that comprises the third lateral support regions for supporting the insulating device parallel to a longitudinal direction with respect to the travelling direction of the vehicle on the bodywork section and the fender for protecting against twisting of the insulating device about the longitudinal axis running in the longitudinal extension of the insulating device.

3. The vehicle according to claim 1, wherein the insulating device further comprises at least one folding edge running transversely to the longitudinal extension of the insulating device,
wherein at least one portion of the insulating device is folded about the at least one folding edge for formation of at least one continuation angularly standing away from the longitudinal extension.

4. The vehicle according to claim 3, wherein the insulating device comprises a tub shape with a surrounding rim as a result of which the insulating device comprises an open cavity.

5. The vehicle according to claim 4, wherein V-shaped notches are introduced in the surrounding rim in an extension of the at least one folding edge that facilitate the folding of the at least one portion of the insulating device about the at least one folding edge and the forming of the at least one continuation angularly standing away with respect to the longitudinal extension of the insulating device.

6. The vehicle according to claim 4,
wherein the surrounding rim comprises a fold that laterally stands away from the surrounding rim, and
wherein the fold forms a sealing lip that support an insulating effect of the insulating device.

7. The vehicle according to claim 4, further comprising an insert reinforcing insulation is insertable in the open cavity of the insulating device.

8. The vehicle according to claim 1,
wherein the at least one continuation is formed as a first continuation,
wherein the first continuation is arranged on a first end of the insulating device, and
wherein the first continuation is secured by a positive connection through a surrounding fender fold and by bearing against another body attachment part against slipping in the travelling direction.

9. The vehicle according to claim 1,
wherein the at least one continuation is formed as a second continuation,
wherein the second continuation is arranged on a second end of the insulating device, and
wherein the second continuation is secured through positive connection on both sides through surrounding fender folds against slipping in the travelling direction.

10. The vehicle according to claim 9, further comprising a liquid drain opening that is introduced in the second continuation.

11. The vehicle according to claim 1, wherein the insulating device is formed of a noise-absorbing material.

12. The vehicle according to claim 11, wherein the noise-absorbing material is a PE-foam.

13. The vehicle according to claim 11, wherein the noise-absorbing material is an EPDM-foil.

* * * * *